(12) United States Patent
Hosokawa et al.

(10) Patent No.: US 11,919,465 B2
(45) Date of Patent: Mar. 5, 2024

(54) APPARATUS FOR DETERMINING BUILD OF OCCUPANT SITTING IN SEAT WITHIN VEHICLE CABIN

(71) Applicant: DENSO CORPORATION, Kariya (JP)

(72) Inventors: Toshio Hosokawa, Kariya (JP); Hiroki Nishimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 455 days.

(21) Appl. No.: 17/071,881

(22) Filed: Oct. 15, 2020

(65) Prior Publication Data
US 2021/0114541 A1     Apr. 22, 2021

(30) Foreign Application Priority Data

Oct. 18, 2019   (JP) .................................. 2019-191466

(51) Int. Cl.
*B60R 21/00*      (2006.01)
*B60R 21/015*     (2006.01)
(Continued)

(52) U.S. Cl.
CPC .. *B60R 21/01538* (2014.10); *B60R 21/01552* (2014.10); *B60W 40/08* (2013.01);
(Continued)

(58) Field of Classification Search
CPC ....... B60R 21/01538; B60R 21/01552; B60W 40/08; B60W 2540/043; B60W 2540/223; G06V 20/59; G06V 40/103
See application file for complete search history.

(56) References Cited

U.S. PATENT DOCUMENTS

| 2007/0289799 A1* | 12/2007 | Aoki | G06V 20/64 |
|---|---|---|---|
| | | | 180/271 |
| 2019/0340451 A1* | 11/2019 | Murakami | G06T 7/62 |
| 2021/0001796 A1* | 1/2021 | Kudo | A61B 5/18 |

FOREIGN PATENT DOCUMENTS

| JP | 4355899 | * 11/2009 |
| JP | 2010203836 A | 9/2010 |
| JP | 2016022145 A | 12/2016 |

OTHER PUBLICATIONS

IP.com, English Translation of Japanese Patent Application Publication No. JP 4355899 to Enomoto (Year: 2009).*

\* cited by examiner

*Primary Examiner* — Ian Jen
(74) *Attorney, Agent, or Firm* — MASCHOFF BRENNAN

(57) ABSTRACT

In an apparatus for determining a build of an occupant sitting in a seat within a cabin of a vehicle, an image acquirer is configured to acquire an image of the occupant. A position-information calculator is configured to calculate shoulder-joint information that is information representing positions of left and right shoulder joints of the occupant in the image. A twisted-posture determiner is configured to determine whether the occupant is in a twisted posture based on the shoulder-joint information. An occupant-build determiner is configured to determine a build of the occupant based on the shoulder-joint information. The occupant-build determiner is further configured to, in response to the twisted-posture determiner determining that the occupant is in the twisted posture, cancel making a determination of the build of the occupant based on shoulder-joint information that was used to determine that the occupant is in the twisted posture.

9 Claims, 9 Drawing Sheets

(51) Int. Cl.
   *B60W 40/08* (2012.01)
   *G06V 20/59* (2022.01)
   *G06V 40/10* (2022.01)
(52) U.S. Cl.
   CPC ............ *G06V 20/59* (2022.01); *G06V 40/103* (2022.01); *B60W 2540/043* (2020.02); *B60W 2540/223* (2020.02)

APPARATUS FOR DETERMINING BUILD OF OCCUPANT SITTING IN SEAT WITHIN VEHICLE CABIN

CROSS-REFERENCE TO RELATED APPLICATION

This application is based on and claims the benefit of priority from earlier Japanese Patent Application No. 2019-191466 filed on Oct. 18, 2019 the description of which is incorporated herein by reference.

BACKGROUND

Technical Field

This disclosure relates to an apparatus for determining a build of an occupant sitting in a seat within a vehicle cabin.

Related Art

Conventionally, an apparatus has been known for determining an occupant build in order to set operating conditions of an airbag device. This apparatus captures, using an imager, an image of an occupant sitting on a seat of a vehicle and acquires positions of a plurality of parts of the occupant based on the captured image. The apparatus calculates distances between the positions of the respective parts of the occupant and determines a build of the occupant from the calculated distances. This allows for setting the operating conditions of the airbag device depending on a weight of the occupant, using the image of the occupant.

BRIEF DESCRIPTION OF THE DRAWINGS

In the accompanying drawings.

DESCRIPTION OF SPECIFIC EMBODIMENTS

Figure 1:
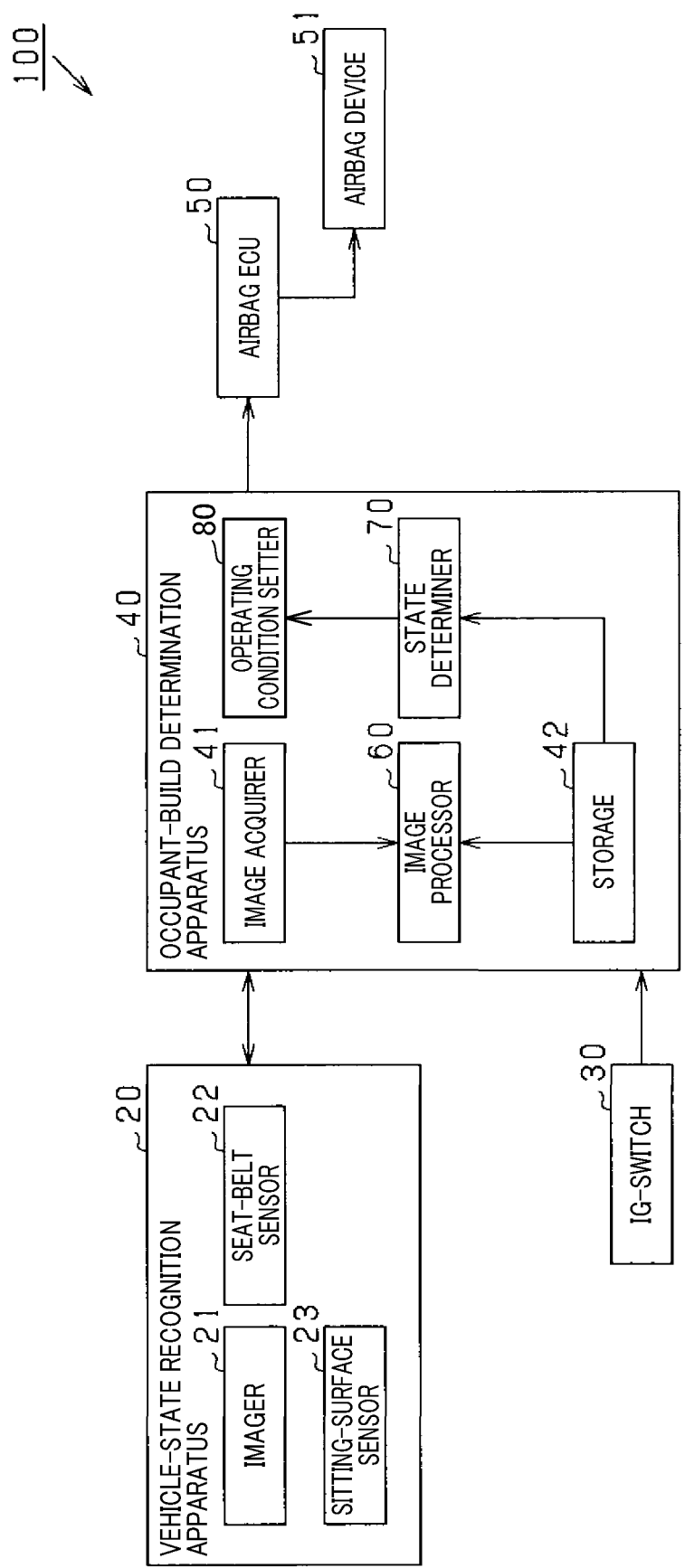
FIG. 1 is a block diagram of an on-board system.

The above known apparatus, as disclosed in JP-A-2008-2838, may capture an image of an occupant in a twisted posture when the occupant is twisting his or her upper body to wear or put on a seat belt. However, in such a case, the apparatus can not accurately acquire positions of the plurality of parts of the occupant, which may lead to a false determination of an occupant's build.

In view of the foregoing, it is desired to have a technique for inhibiting such a false determination of an occupant's build.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

In the following, embodiments of the present disclosure will be described in more detail with reference to the appended drawings. However, the present disclosure may be embodied in many different forms, and it should not be construed that the present disclosure is limited to the embodiments set forth herein. These embodiments are rather provided to make the disclosure thorough and complete, and to fully convey the scope of the disclosure to those skilled in the art. Note that similar reference signs denote similar components throughout the drawings.

An on-board system 100 mounted to a vehicle, according to a first embodiment, will now be described. As illustrated in FIG. 1, the on-board system 100 includes a vehicle-state recognition apparatus 20, an ignition switch (IG-switch) 30, an occupant-build determination apparatus 40, an airbag electronic control unit (ECU) 50, and an airbag device 51.

The occupant build determination apparatus 40 is configured to, based on information from the vehicle-state recognition apparatus 20, determine a build of each of occupants sitting in seats 14 (see FIG. 3) within a vehicle cabin, such as a driver seat 14A, a front passenger seat 14B and the like, and based on a result of determination, set an operating condition of the airbag device 51.

Figure 2:
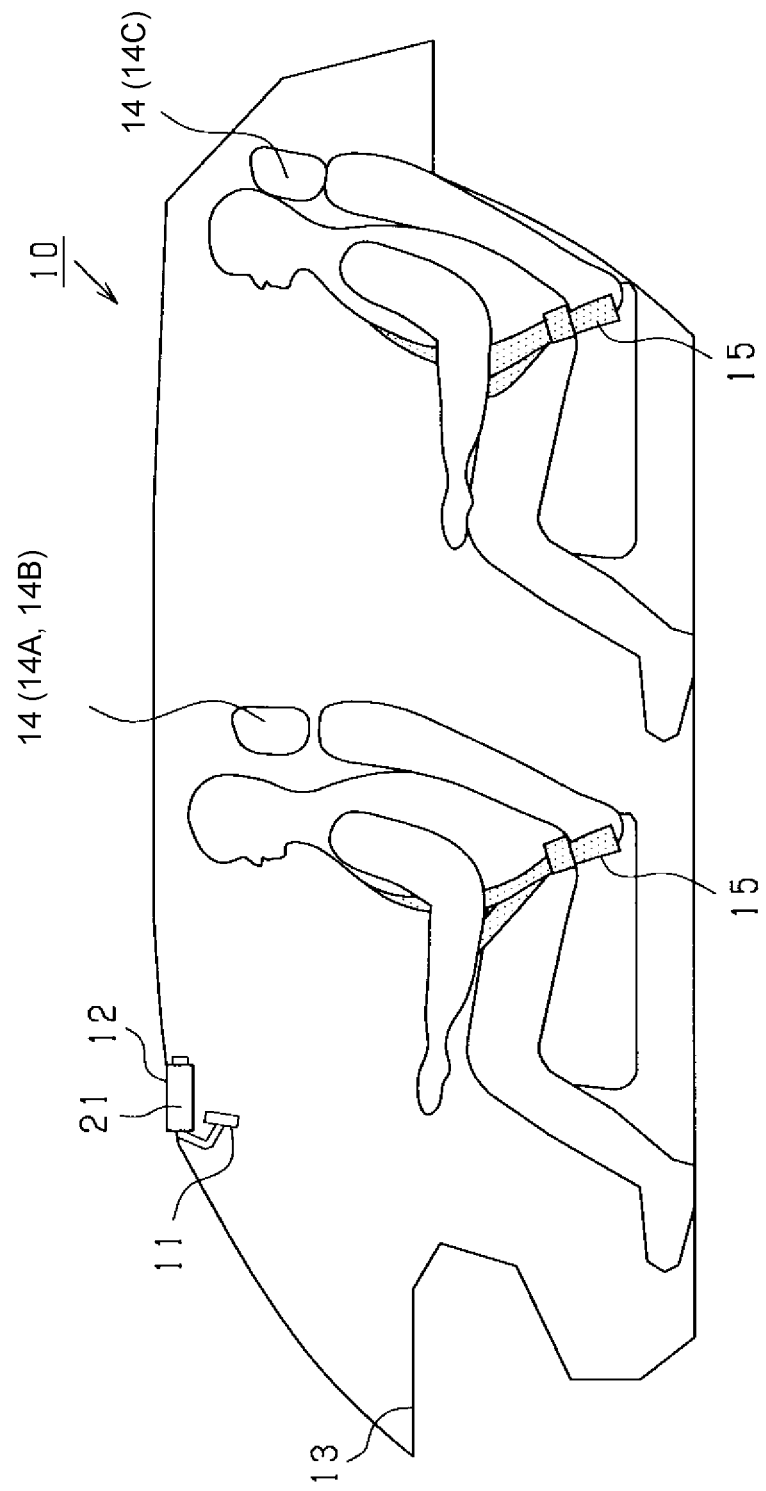
FIG. 2 is an illustration of an installation location of an imager.

The vehicle-state recognition apparatus 20 includes an imager 21, a seat-belt sensor 22, and a sitting-surface sensor 23. The imager 21 may be a charge-coupled device (CCD) camera, which is configured to capture images GA within the vehicle cabin using lighting equipment such as a near-infrared LED or the like. As illustrated in FIG. 2, the imager 21, which is looking toward the driver seat 14A and the front-passenger seat 14B, is installed in an overhead console 12 located above a rearview mirror 11 within the vehicle 10. Instead of being installed in the overhead console 12, the imager 21 may be installed on an instrument panel 13 or to the rearview mirror 11.

Figure 3:
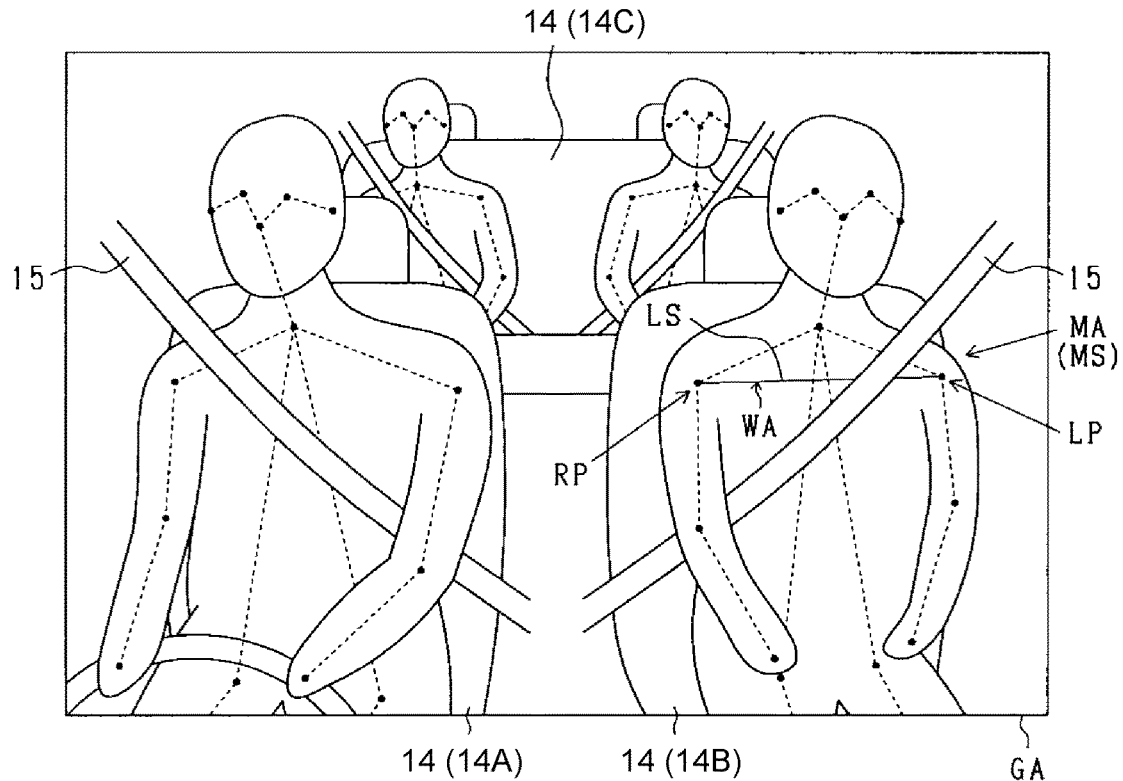
FIG. 3 is an example image.

As illustrated in FIG. 3, an imaging range of the imager 21 include the seats 14 including the driver seat 14A, the front passenger seat 14B, and the rear seat 14C. Therefore, use of the imager 21 can provide an image of upper bodies of respective occupants sitting in the seats 14.

The seat-belt sensor 22 is configured to detect a drawn amount of the seat belt 15. More specifically, the seat-belt sensor 22 is an encoder adapted to detect a rotation angle of a motor provided to feed and retract the seat belt 15. The sitting-surface sensor 23 is configured to detect a pressure distribution over a seat part of each of the driver seat 14A and the front passenger seat 14B.

The IG-switch 30 is an activation switch for the vehicle 10. The occupant-build determination apparatus 40 is configured to monitor an on-off state of the IG-switch 30.

The occupant-build determination apparatus 40 is configured as a microcomputer including a central processing unit (CPU), a read only memory (ROM), a random access memory (RAM), an input/output interface (I/O), and other components, and acquires various information from the vehicle-state recognition apparatus 20. The occupant build determination apparatus 40 and the vehicle-state recognition apparatus 20 are communicably connected to each other via wired communications, such as a controller area network (CAN), or via wireless communications, such as a wireless local area network (LAN), Bluetooth (registered trademark) or the like. The occupant-build determination apparatus 40 includes, as functional blocks, an image acquirer 41, an image processor 60, and a state determiner 70, where functions of them are implemented by the CPU executing computer programs stored in the ROM.

Figure 4:
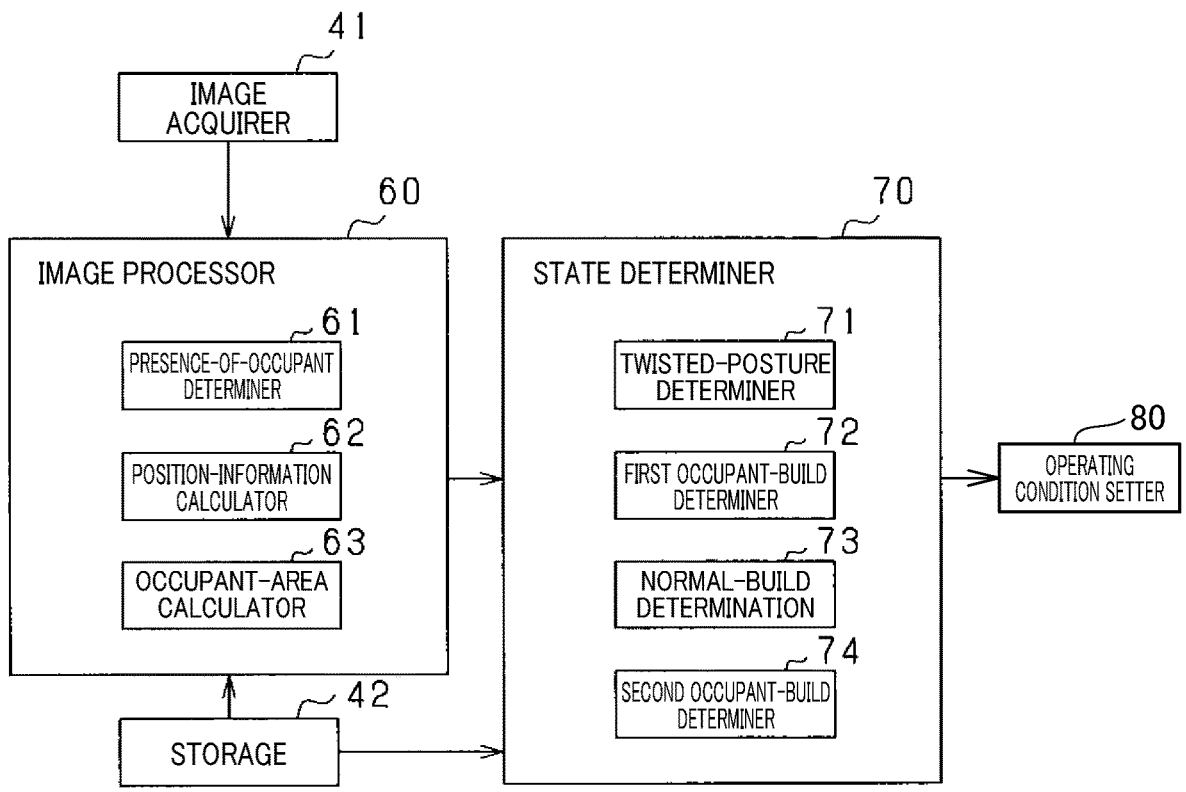
FIG. 4 is a functional block diagram of an occupant build determination apparatus.

Various functions implemented by the occupant-build determination apparatus 40 will now be described with reference to FIG. 4. During vehicle operation where the IG-switch 30 is in an on-state, the image acquirer 41 acquires an image of occupants, GA, captured by the imager 21.

The image processor 60 performs, based on the image GA acquired by the image acquirer 41, (1) a presence-of-occupant determination process, (2) a position-information calculation process, and (3) an occupant-area calculation process. The image processor includes, as functional blocks to perform these processes, a presence-of-occupant determiner 61, a position-information calculator 62, and an occupant-area calculator 63.

(1) Presence-of-Occupant Determination Process

The presence-of-occupant determiner 61 determines, based on the image GA, whether there are one or more occupants within a vehicle cabin. The determination as to whether there are one or more occupants within a vehicle cabin is made, for example, using facial recognition based on facial recognition data stored in the storage 42. The storage 42 stores various information used by the image processor 60 and the state determiner 70. Since the image GA is captured during vehicle operation, the imager 21 acquires an image GA of one or more occupants sitting in the seats 14. The presence-of-occupant determiner 61 therefore determines whether there are one or more occupants sitting in the seats 14.

(2) Position-Information Calculation Process

The position-information calculator 62 calculates position information MA that represents positions of feature points of each occupant in the image GA. The position-information calculator 62 performs image processing only on an area in the vicinity of each occupant in the image GA. The position-information calculator 62 identifies positions of feature points of the occupant in the image GA via such image processing and calculates the position information MA.

As illustrated in FIG. 3, the positions of feature points include positions of parts of a face and positions of joints on a human body. The parts of a face include eyes, a nose, and ears. The joints on a human body include a neck joint, shoulder joints, elbow joints, wrist joints, a right waist joint, and a left waist joint. The position information MA includes shoulder-joint information MS that represents positions of the shoulder joints of each occupant in the image GA. The shoulder-joint information MS includes right-shoulder-joint information representing a position of the right shoulder joint RP and left-shoulder-joint information representing a position of the left shoulder joint LP.

(3) Occupant-Area Calculation Process

Figure 5:
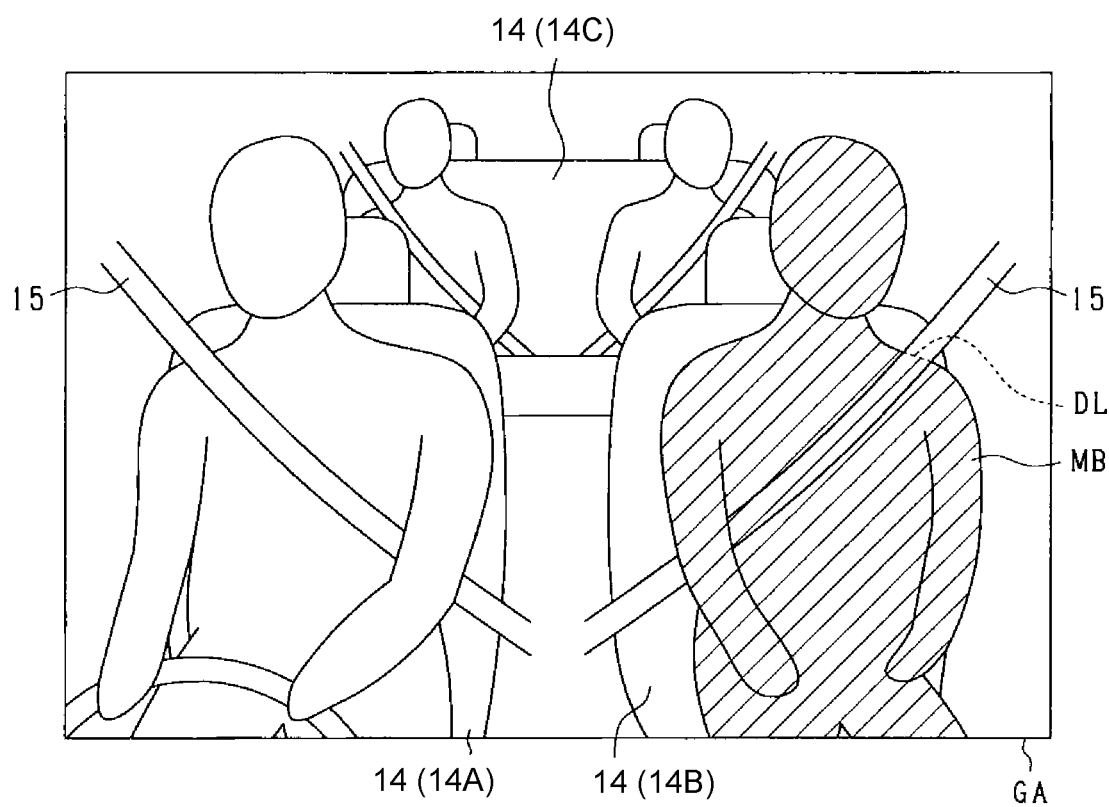
FIG. 5 is an illustration of an occupant-area of an occupant according to a first embodiment.

The occupant-area calculator 63 calculates an occupant-area MB that is an occupied area of each occupant in the image GA. In an example case where an occupant is sitting in the front passenger seat 14B as illustrated in FIG. 5, the occupant-area calculator 63 calculates the occupant-area MB using image recognition processing, such as semantic image segmentation. In this case, the occupant-area calculator 63 identifies a border position between a body of the occupant and the seat belt 15 in an occupied area of the seat belt as indicated by the dotted line DL in FIG. 5, and calculates the occupant-area MB.

The state determiner 70 performs, based on the position information MA and the occupant-area MB calculated by the image processor 60, (1) a twisted posture determination process, (2) a first occupant-build determination process, and (3) a normal-build determination process, and (4) a second occupant-build determination process. The state determiner 70 includes, as functional blocks to perform these processes, a twisted-posture determiner 71, a first occupant-build determiner 72, a normal-build determination 73, and a second occupant-build determiner 74.

(1) Twisted-Posture Determination Process

The twisted-posture determiner 71 determines, for each occupant, whether the occupant is in a twisted posture, based on shoulder-joint information MS included in the position information MA. The twisted posture means that the occupant sitting in the seat 14 is twisting his/her upper body. More specifically, as illustrated in FIG. 6, the twisted posture is a position such that a shoulder angle $\theta$ that is an angle of a linear line LS connecting the position of the right shoulder joint RP and the position of the left shoulder joint LP with respect to the horizontal direction is greater than a predetermined angle $\theta th$.

Figure 6:
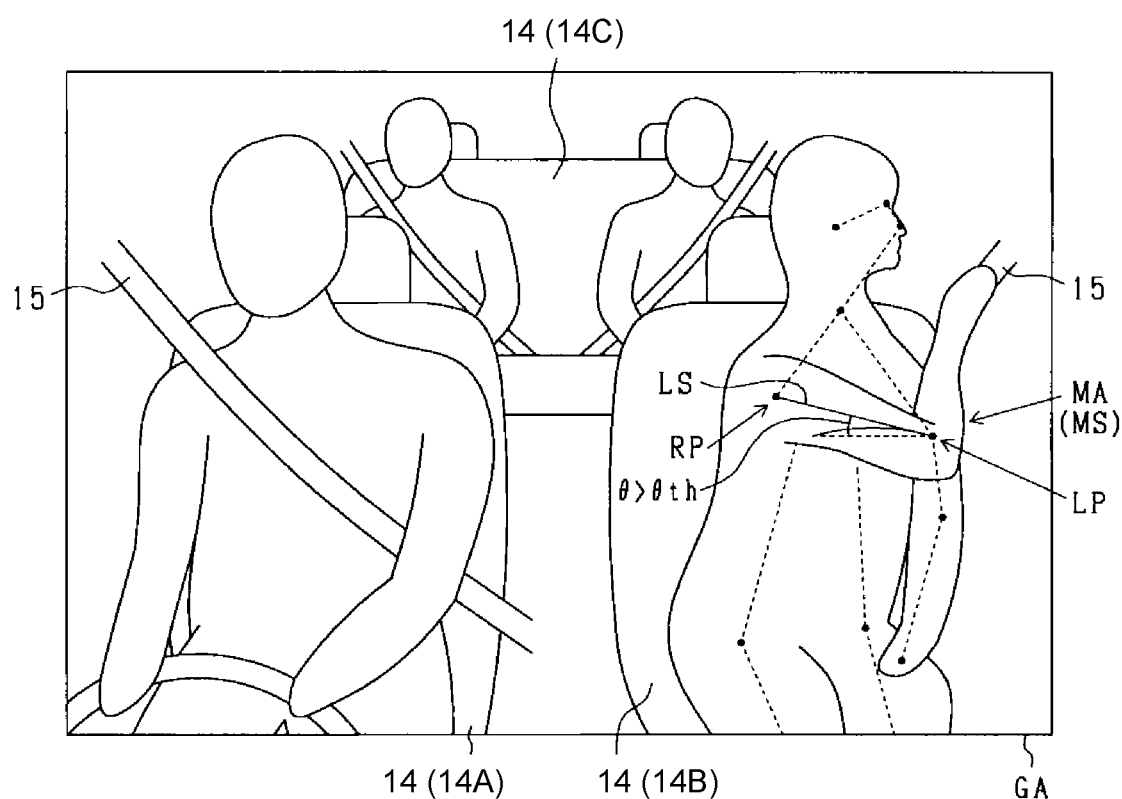
FIG. 6 is an illustration of a shoulder angle of an occupant.

As illustrated in FIG. 6 where an occupant is sitting in the front passenger seat 14B, when the occupant sitting in the front passenger seat 14B raises his/her right arm toward the seat belt 15 disposed above the vehicle door to wear it, the occupant twists his/her upper body, such that the position of the right shoulder joint RP is higher than the position of the left shoulder joint LP. When the shoulder angle $\theta$ is greater than the predetermined angle $\theta th$, the twisted-posture determiner 71 determines that the occupant is in the twisted posture to wear the seat belt 15.

(2) First Occupant-Build Determination Process

The first occupant-build determiner 72 determines, for each occupant, a build of the occupant based on the shoulder-joint information MS. More specifically, as illustrated in FIG. 3, the first occupant-build determiner 72 determines a build of the occupant based on a shoulder-width WA that is a length of a linear line segment LS between the position of the right shoulder joint RP and the position of the left shoulder joint LP. In the present embodiment, the first occupant-build determiner 72 serves as a "build determiner".

The first occupant-build determiner 72 determines, for each occupant, a build of the occupant on multiple levels of build. More specifically, the first occupant-build determiner 72 determines the build of the occupant is at an adult-build level or at a child-build level. For example, if the shoulder-width WA is less than a first shoulder-width threshold, the first occupant-build determiner 72 determines that the build of the occupant is at the child-build level. If the shoulder-width WA is equal to or greater than the first shoulder-width threshold, the first occupant-build determiner 72 determines that the build of the occupant is at the adult-build level.

If the build of the occupant is at the adult-build level, the first occupant-build determiner 72 determines whether the build of the occupant is at an adult-male-build level or at an adult-female-build level. For example, if the shoulder-width WA is less than a second shoulder-width threshold, the first occupant-build determiner 72 determines that the build of the occupant is at the adult-female-build level. If the shoulder-width WA is equal to or greater than the second shoulder-width threshold, the first occupant-build determiner 72 determines that the build of the occupant is at the adult-male-build level.

The child-build level is a 6-year-old build level, for example, 6YO sized build level of a crash test anthropomorphic dummy for the vehicle 10. The adult-female-build level is a build level of a small American woman, for example, AF05 sized build level of the crash test anthropomorphic dummy for the vehicle 10. The adult-male-build level is a build level of an average American man, for example, AM50 sized build level of the crash test anthropomorphic dummy for the vehicle 10. A normal build at each build level is as follows:

6YO:120±5 cm,23.4±2.3 kg;
AF05:145±5 cm,49±2.3 kg; and
AM50:175±5 cm,78±2.3 kg.

(3) Normal-Build Determination Process

The normal-build determiner 73 determines, for each occupant, whether the build of the occupant is a normal build based on the position information MA. Normal-build data DB, which is data about a predefined normal build at each build level, is stored in the storage 42. The normal-build determiner 73 determines, based on this position information MA, whether the build of the occupant is a normal build.

Figure 7:
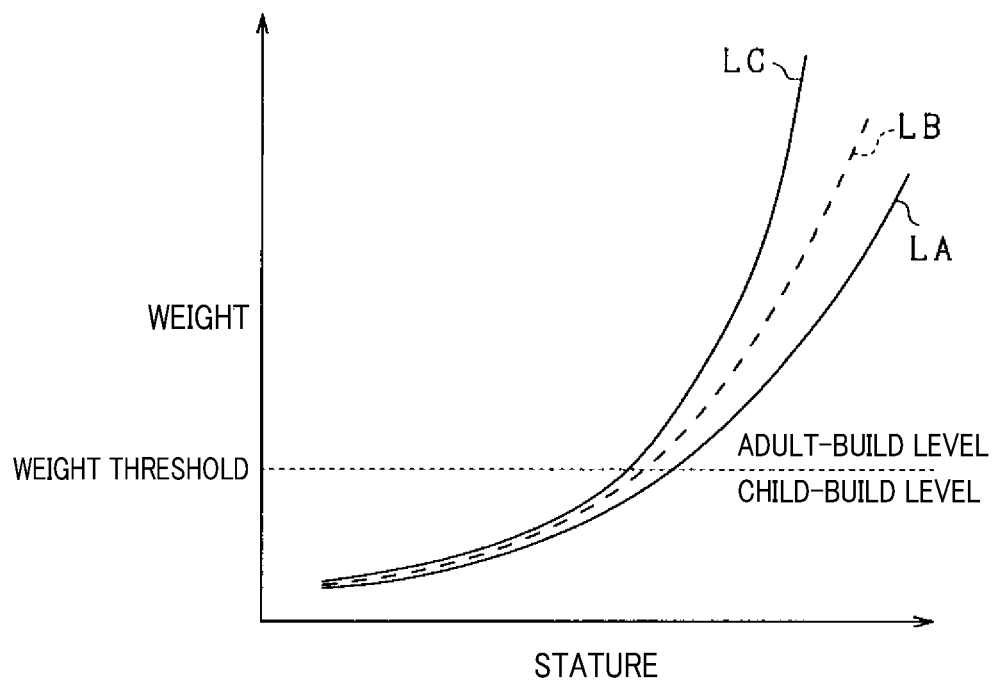
FIG. 7 is a graph illustrating a correspondence between occupant's stature and weight.

FIG. 7 illustrates an example of the normal-build data DB. In FIG. 7, a correspondence between the stature and the weight for each normal build is indicated by the broken line LB. As illustrated in FIG. 7, the normal-build data DB is continuous data including data for the respective normal builds at the multiple build levels.

However, the actual build of the occupant is not necessarily the same as any normal build, but may vary between the solid lines LA, LC as illustrated in FIG. 7. As illustrated in FIG. 7, the variation in weight increases with increasing stature. Therefore, when the stature is low and the build of the occupant is at the child-build level, the build of the occupant has a small variation. In such a case, the build of the occupant can be determined to be a normal build. In contrast, when the stature is high and the build of the occupant is at the adult-build level, the build of the occupant has a large variation. In such a case, the build of the occupant is not necessarily a normal build. Therefore, if the first occupant-build determiner 72 determines that the build of the occupant is at the adult-build level, the normal-build determiner 73 determines whether the build of the occupant is a normal build.

For example, the normal-build determiner 73 calculates, based on the position information MA, a sitting height that is a length of a linear line segment connecting a middle position between the position of the right shoulder joint RP and the position of the left shoulder joint LP and a middle position between the position of the right waist joint and the position of the left waist joint, and calculates a ratio of the shoulder-width WA to the sitting height. If this ratio is within a predefined range based on the normal builds, the normal-build determiner 73 determines that the build of the occupant is a normal build. If this ratio is out of this predetermined range, the normal-build determiner 73 determines that the build of the occupant is not any normal build.

(4) Second Occupant-Build Determination Process

If the normal-build determiner 73 determines that the build of the occupant is not any normal build, the second occupant-build determiner 74 determines the build of the occupant based on the occupant-area MB. As described above, the normal-build determiner 73 determines whether the build of the occupant determined to be at the adult-build level is a normal build. The second occupant-build determiner 74 also determines the build of the occupant determined to be at the adult-build level.

More specifically, the second occupant-build determiner 74 determines, based on the occupant-area MB, whether the build of the occupant is at the adult-female-build level or at the adult-male-build level. If the occupant-area MB is less than the occupant-area threshold, the second occupant-build determiner 74 determines that the build of the occupant is at the adult-female-build level. If the occupant-area MB is equal to or greater than the occupant-area threshold, the second occupant-build determiner 74 determines that the build of the occupant is at the adult-male-build level.

Once the build of the occupant is determined by the first or second occupant-build determiners 72, 74, the occupant-build determination apparatus 40 sets an operating condition of the airbag device 51 based on a result of determination. The operating condition of the airbag device 51 is a condition relating to the start timing, the air pressure and the like. For a higher occupant-build level, the start timing is set earlier and the air pressure is set higher. The adult-build level is higher than the child-build level. The adult-male-build level is higher than the adult-female-build level. In the present embodiment, the airbag device 51 serves as an "occupant restraining device."

In response to setting the operating condition of the airbag device 51, the occupant-build determination apparatus 40 outputs this operating condition to the airbag ECU 50. The airbag ECU 50 controls the airbag device 51 based on the operating condition received from the occupant-build determination apparatus 40.

Figure 8:
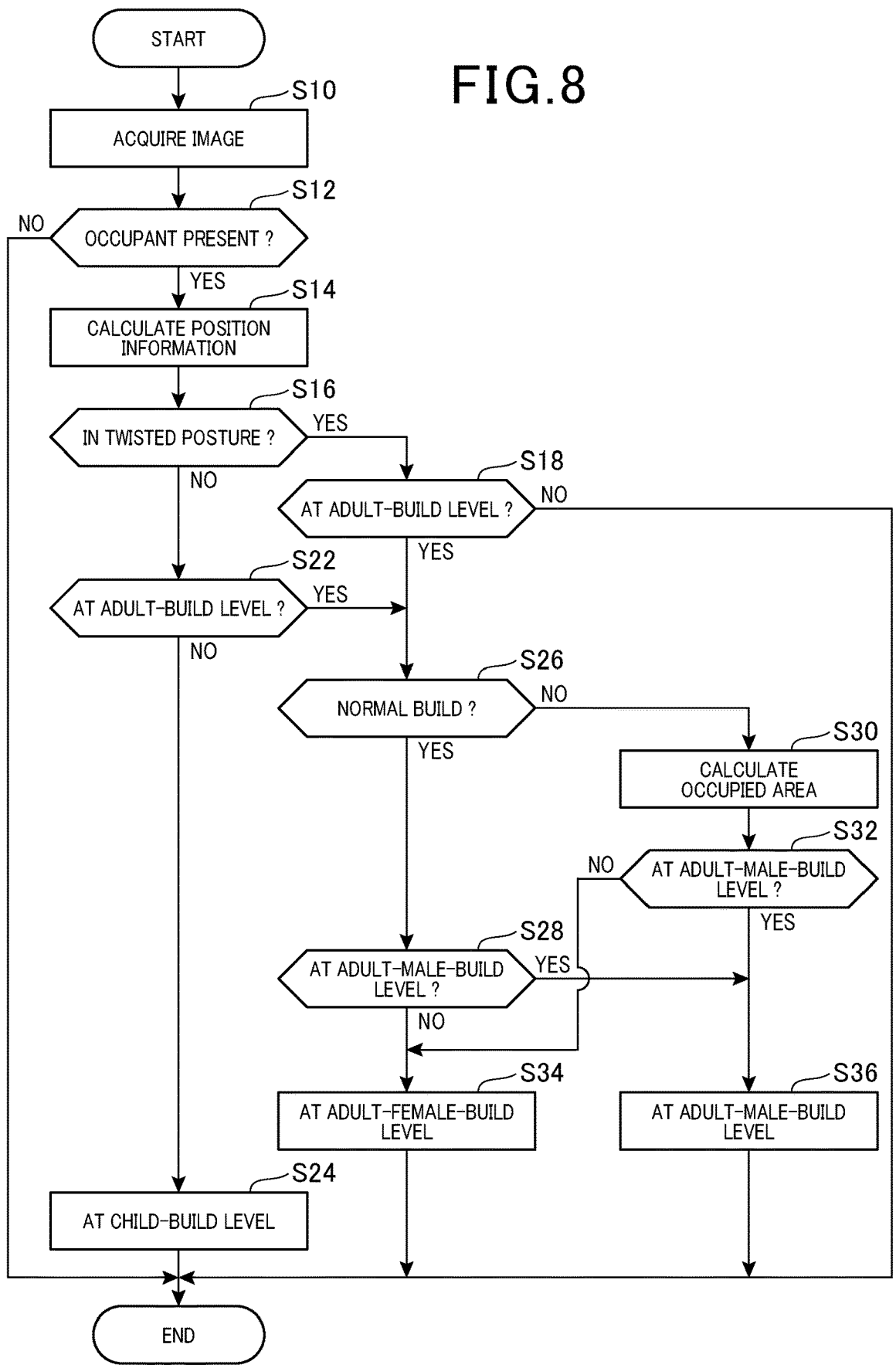
FIG. 8 is a flowchart of a determination process according to the first embodiment.

An occupant-build determination process will now be described with reference to a flowchart of FIG. 8. This determination process is repeatedly performed by the occupant-build determination apparatus 40 every predetermined time interval during vehicle operation.

At step S10, the image acquirer 41 acquires an image GA. At step S12, the presence-of-occupant determiner 61 determines whether there are one or more occupants within a vehicle cabin.

If at step S12 the presence-of-occupant determiner 61 determines that there are no occupants within the vehicle cabin ("NO" branch of step S12), then process flow ends. If at step S12 the presence-of-occupant determiner 61 determines that there are one or more occupants within the vehicle cabin, that is, if there are one or more occupants sitting in the seats 14 within the vehicle cabin ("YES" branch of step S12), then at step S14 the position-information calculator 62 calculates position information MA including shoulder-joint information MS.

At step S16, based on the shoulder-joint information MS calculated at step S14, the twisted-posture determiner 71 determines, for each occupant sitting in the seat 14, determines whether the occupant is in a twisted posture.

If a shoulder angle θ of the occupant is greater than a predetermined angle θth ("YES" branch of step S16), the twisted-posture determiner 71 determines that the occupant is in a twisted posture. In this case, at step S18, based on the shoulder-joint information MS calculated at step S14, the first occupant-build determiner 72 determines whether the build of the occupant is at the adult-build level.

If a shoulder-width WA of the occupant is less than the first shoulder-width threshold ("NO" branch of step S18), the first occupant-build determiner 72 determines that the build of the occupant is not at the adult-build level, then the process flow ends.

If the shoulder-width WA of the occupant is equal to or greater than the first shoulder-width threshold ("YES" branch of step S18), the first occupant-build determiner 72 determines that the build of the occupant is at the adult-build level. That is, even though it is determined by the twisted-posture determiner 71 using the shoulder-joint information MS that the occupant is in a twisted posture, the first occupant-build determiner 72 determines, based on the same shoulder-joint information MS, that the build of the occupant is at the adult-build level if the shoulder-width WA of the occupant is equal to or greater than the first shoulder-width threshold. Thereafter, the process flow proceeds to step S26.

If the shoulder angle θ of the occupant is less than the predetermined angle θth ("NO" branch of step S16), the twisted-posture determiner 71 determines that the occupant is not in the twisted posture. In this case, at step S22, based on the shoulder-joint information MS calculated at step S14, the first occupant-build determiner 72 determines whether the build of the occupant is at the adult-build level or at the child-build level. Since at step S22 the determination is made as to whether the build of the occupant is at the adult-build level or at the child-build level, the determination made at step S22 is different from the determination made at step S18 at which the determination is made as to whether the build of the occupant is at the adult-build level, but no determination is made as to whether the build of the occupant is at the child-build level.

If the shoulder-width WA of the occupant is less than the first shoulder-width threshold ("NO" branch of step S22), then at step S24 the first occupant-build determiner 72 determines that the build of the occupant is at the child-build level. Thereafter, the process flow ends.

At step S22, if the shoulder-width WA of the occupant is equal to or greater than the first shoulder-width threshold, the first occupant-build determiner 72 determines that the build of the occupant is at the adult-build level ("YES" branch of step S22). In this case, the process flow proceeds to step S26. That is, as shown by steps S18, S22, regardless of a result of determination made by the twisted-posture determiner 71, if the shoulder-width WA is equal to or greater than the first shoulder-width threshold, it is determined that the build of the occupant is at the adult build level. The process flow then proceeds to step S26.

At step S26, the normal-build determiner 73 determines, based on the shoulder-joint information MS calculated at step S14, whether the build of the occupant is a normal build.

If at step S26 the normal-build determiner 73 determines that the build of the occupant is a normal build ("YES" branch of step S26), then at step S28 the first occupant-build determiner 72 determines, based on the shoulder-joint information MS calculated at step S14, whether the build of the occupant is at the adult-male-build level or at the adult-female-build level.

If the shoulder-width WA of the occupant is less than the second shoulder-width threshold ("NO" branch of step S28), then at step S34 the first occupant-build determiner 72 determines that the build of the occupant is at the adult-female-build level. Thereafter, the process flow ends. If the shoulder-width WA of the occupant is equal to or greater than the second shoulder-width threshold ("YES" branch of step S28), then at step S36 the first occupant-build determiner 72 determines that the build of the occupant is at the adult-male-build level. Thereafter, the process flow ends.

If the normal-build determiner 73 determines that the build of the occupant is not any normal build ("NO" branch of step S26), then at step S30 the occupant-area calculator 63 calculates an occupant-area MB. That is, the occupant-area calculator 63 calculates an occupant-area MB, provided that it is determined by the normal-build determiner 73 that the build of the occupant is not any normal build.

Subsequently, at step S32, the second occupant-build determiner 74 determines, based on the occupant-area MB calculated at step S30, whether the build of the occupant is at the male-build level.

If the occupant-area MB is less than the occupant-area threshold ("NO" branch of step S32), then the process flow proceeds to step S34. If the occupant-area MB is equal to or greater than the occupant-area threshold ("YES" branch of step S32), then the process flow proceeds to step S36.

The first embodiment set forth above can provide the following advantages.

(A1) For example, when an occupant sitting in a seat 14 raises his/her arm on the opposite side from a vehicle door toward a seat belt 15 installed above the door to wear the seat belt 15, a position of the shoulder joint on the opposite side from the vehicle door is elevated above a position of the shoulder joint on the door side and the occupant is in a twisted posture such that the occupant is twisting his/or upper body. That is, a twisted posture of an occupant sitting in a seat 14 is accompanied with a variation in each shoulder joint position.

In the present embodiment, an image GA of an occupant sitting in a seat 14 is captured using the imager 21. Shoulder-joint information MS is calculated from this image GA. This allows a determination as to whether the occupant is in a twisted posture to be made based on positions of shoulder joints of the occupant represented by the shoulder-joint information MS.

(A2) In the present embodiment, to determine whether the occupant is in a twisted posture, a shoulder angle θ of the occupant is calculated based on the shoulder-joint information MS. A determination as to whether the occupant is in a twisted posture is made based on the calculated shoulder angle θ. The shoulder angle of the occupant depends only on a degree of twist in the twisted posture of the occupant, which allows not only a determination as to whether the occupant is in a twisted posture, but also a determination of a degree of twist in the twisted posture, to be made based on the shoulder angle θ.

Indeed, a determination as to whether the occupant is in a twisted posture can also be made based on a vertical difference between the position of the right shoulder joint RP and the position of the left shoulder joint LP. However, the vertical difference between the position of the right shoulder joint RP and the position of the left shoulder joint LP depends not only on the degree of twist in the twisted posture, but also on the shoulder-width WA of the occupant. Therefore, in the present embodiment, a determination as to whether the occupant is in a twisted posture is made based on the shoulder angle θ, which allows the degree of twist in the twisted posture of the occupant to be adequately made.

(A3) If, despite the occupant being in a twisted posture, the shoulder-width WA of the occupant is equal to or greater than the first shoulder-width threshold, the build of the occupant is at the adult-build level and can not be at the child-build level. In the present embodiment, if the shoulder-width WA of the occupant is equal to or greater than the first shoulder-width threshold, it is determined that the build of the occupant is the adult-build level, regardless of whether the occupant is in a twisted posture. This allows the build of the occupant to be determined early if the build of the occupant is at the adult-build level.

(A4) If the build of the occupant is at the child-build level, the build ratio of the weight to the stature of the occupant is substantially constant (see FIG. 6). Therefore, making a determination of the build of the occupant based on the shoulder-joint information MS could lead to the build of the occupant that is substantially the same as a normal build. In contrast, if the build of the occupant is at the adult-build level, the build ratio of the weight to the stature of the occupant has a large variation (see FIG. 6). Thus, in cases where the build of the occupant is different from any normal build, making a determination of the build of the occupant based on the shoulder-joint information MS could not lead to an adequate determination of the build of the occupant.

In the present embodiment, if the build of the occupant is at the adult-build level, a determination of the build of the occupant is made based on the occupant-area MB that is an occupied area of the occupant. Since the length of the occupied area varies with the stature of the occupant and the width of the occupied area varies with the weight of the occupant, the occupant-area MB represents a surface area of the occupant, regardless of whether the build of the occupant is a normal build. The surface area of the occupant is proportional to the volume of the occupant, and the volume of the occupant represents the weight of the occupant, thus the build of the occupant. This allows for a weight-based determination of the build of the occupant.

(A5) More specifically, if it is determined that the build of the occupant is at the adult-build level, whether the build of the occupant is a normal build is determined based on the predetermined normal-build data DB. The occupant-area MB is calculated, provided that the build of the occupant is not any normal build. Therefore, if the build of the occupant is a normal build, a determination of the build of the occupant can be made without calculating the occupant-area MB, which can reduce a processing burden of the occupant-build determination apparatus 40. If the build of the occupant is not any normal build, an adequate determination of the build of the occupant can be made by calculating the occupant-area MB, regardless of whether the build of the occupant is a normal build.

Second Embodiment

Figure 9:
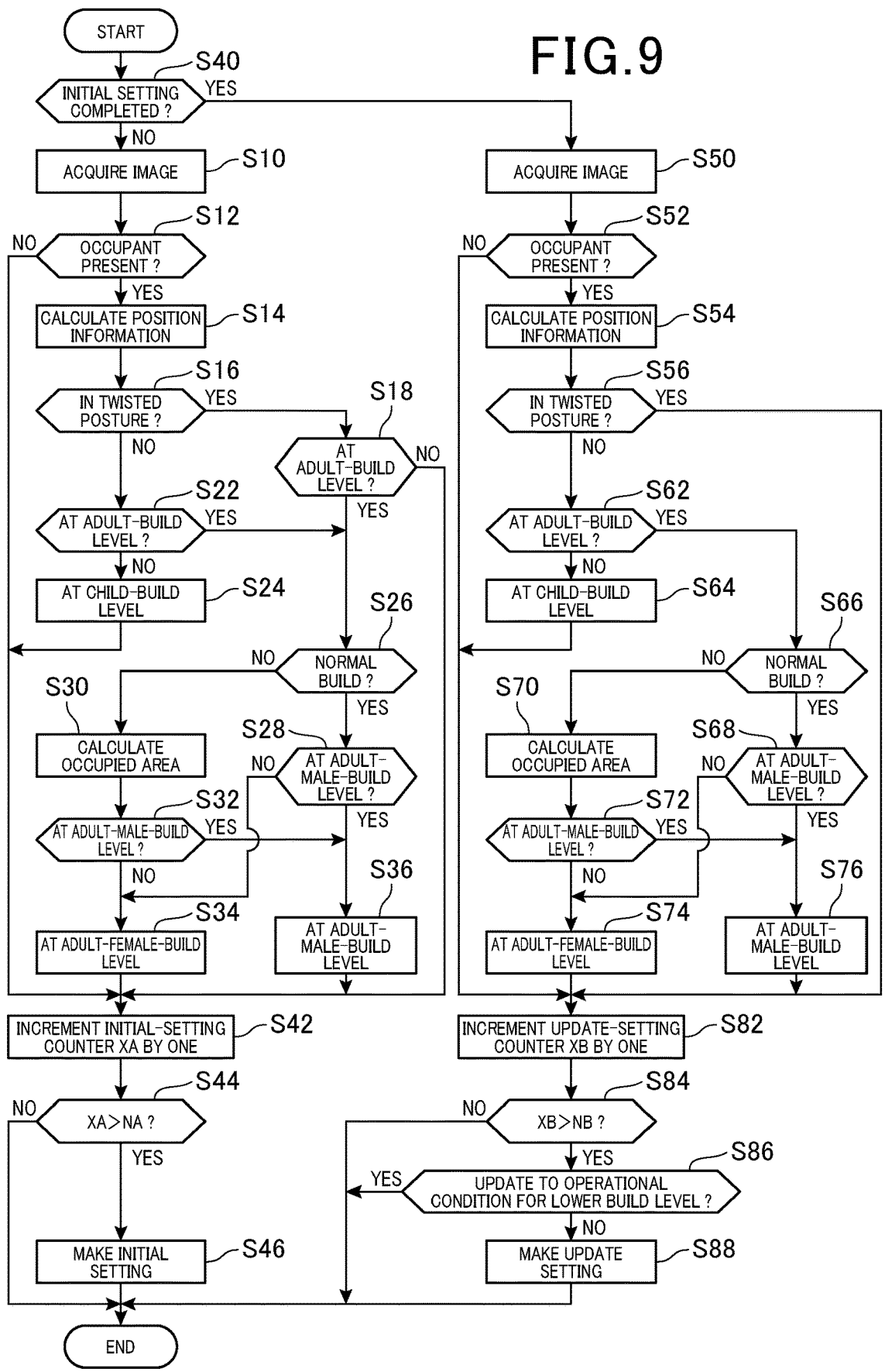
FIG. 9 is a flowchart of a determination process according to a second embodiment.

Differences from the first embodiment will be described below with reference to FIGS. 9, 10. The second embodiment is different from the first embodiment in that the occupant-build determination process includes a process of setting an operating condition of the airbag device 51.

The occupant-build determination apparatus 40 makes an initial setting and an update setting of the operating condition of the airbag device 51. In each of an initial-setting process and an update-setting process, the operating condition of the airbag device 51 is set based on results of determination of the build of the occupant (hereinafter referred to as effective results of determination) among results of determination made by the first and second occupant-build determiners 72, 74. The number of determinations to be made until the initial setting of the operating condition of the airbag device 51 is made (hereinafter, the number of initial-setting determinations NA) and the number of determinations to be made until the update setting of the operating condition of the airbag device 51 is made (hereinafter, the number of update-setting determinations NB) are different. The number of initial-setting determinations NA is set less than the number of update-setting determinations NB.

For example, to enable the airbag device 51 to operate even when the vehicle 10 is suddenly started immediately after start-up of the vehicle 10, it is desired that the initial-setting process of making an initial setting of the operating condition of the airbag device 51 be completed early. In the update-setting process after completion of the initial-setting process, it is desired that the build of the occupant be adequately determined to enable the airbag device 51 to operate properly.

In the present embodiment, the number of initial-setting determinations NA is set to a relatively small integer, which allows the initial-setting process to be early completed upon start-up of the vehicle caused by the IG-switch 30 being turned on. The number of update-setting determinations NB is set to a relatively large integer, which allows for acquisition of relatively many effective results of determination. That is, the build of the occupant can be adequately determined.

In the present embodiment, in the initial-setting process, a determination as to whether the build of the occupant is at the adult-build level may be made based on the shoulder-joint information MS that was used to determine that the occupant is in a twisted posture. In the update-setting process, it is prohibited to make a determination of the build of the occupant based on the shoulder-joint information MS that was used to determine that the occupant is in a twisted posture. With this configuration, in the initial-setting process, even though the number of initial-setting determinations NA is relatively small, the number of effective results of determination acquired through the number of initial-setting determinations NA can be increased. In the update-setting process, impact of the twisted posture on the effective results of determination can be removed.

In the present embodiment, in the update-setting process, updating the operating condition set in the initial-setting process to an operating condition for a lower build level is prohibited or proscribed. As described above, in the initial-setting process, the number of initial-setting determinations NA is relatively small. Thus, a sufficient number of effective results of determination can not be acquired, which may lead to a reduction in the determination accuracy that is represented by a ratio of the number of effective results of determination to the number of initial-setting determinations NA. For example, if the effective results of determination include results of determination of the build of the occupant based on the shoulder-width WA of the occupant in a twisted posture, the reduced determination accuracy leads to increased impact of the twisted posture on the effective results of determination. The build level of the occupant may thus be incorrectly determined to be lower than the actual build level of the occupant. Conversely, the build level of the occupant may not be determined to be higher than the actual build level of the occupant even if the determination accuracy is reduced. That is, if the operating condition set in the initial-setting process is updated to an operating condition for a lower build level, a false determination of the build of the occupant is likely to occur after completion of the initial-setting process. Therefore, in such a case, updating the operating condition is prohibited. This can inhibit an update setting of the operating condition of the airbag device 51 from being made based on a false determination of the build of the occupant.

The occupant-build determination process according to the present embodiment will now be described with reference to the flowchart of FIG. 9. In order to facilitate understanding of the description, the same process steps as those in FIG. 8 share the same reference numerals, and overlapping description is omitted.

In the occupant-build determination process according to the present embodiment, at step S40, the operating condition setter 80 determines whether an initial setting of the operating condition of the airbag device 51 has been made. Whether an initial setting of the operating condition of the airbag device 51 has been made may be determined based on whether an initial-setting period HA (see FIG. 10) has elapsed since the IG-switch 30 switches to the ON-state. That is, the initial-setting period HA (see FIG. 10) has elapsed since the IG-switch 30 switches to the ON-state, the operating condition setter 80 determines that an initial setting of the operating condition of the airbag device 51 has been made.

If the operating condition setter 80 determines that an initial setting of the operating condition of the airbag device 51 has not been made yet ("NO" branch of step S40), steps S10 to S36 are performed, then the process flow proceeds to step S42. At step S42, the operating condition setter 80 increments an initial-setting counter XA by one. The initial setting counter XA is a counting measure to count the number of initial-setting determinations NA.

Subsequently, at step S44, the operating condition setter 80 determines whether the initial-setting counter XA is greater than the number of initial-setting determinations NA. If the initial-setting counter XA is not greater than the number of initial-setting determinations NA ("NO" branch of step S44), the process flow ends without making an initial setting of the operating condition. If the initial-setting counter XA is greater than the number of initial-setting determinations NA ("YES" branch of step S44), then at step S46 the operating condition setter 80 makes an initial setting of the operating condition. Thereafter, the process flow ends.

If at step S40 the operating condition setter 80 determines that an initial setting of the operating condition of the airbag device 51 has been made ("YES" branch of step S40), steps S50 to S76 are performed, then the process flow proceeds to step S82. Steps S50 to S76 are substantially the same as steps S10 to S36, but different in that a step corresponding to step S18 is not included.

That is, in the sequence of steps S50 to S76, if at step S56 corresponding to step S16 it is determined that the occupant is in a twisted posture, the process flow proceeds to step S82, where a determination as to whether the build of the occupant is at the adult-build level is not to be made based on the shoulder-joint information MS calculated at step S54 corresponding to step S14. That is, in the update-setting process, it is prohibited to make a determination of the build of the occupant based on the shoulder-joint information MS that was used to determine that the occupant is in a twisted posture.

At step S82, the operating condition setter 80 increments an update-setting counter XB by one. The update-setting counter XB is a counting measure to count the number of update-setting determinations NB.

Subsequently, at step S84, the operating condition setter 80 determines whether the update-setting counter XB is greater than the number of update-setting determinations NB. In the present embodiment, the number of update-setting determinations NB is set greater than the number of initial-setting determinations NA. That is, the condition for making an update setting is set more stringent than the condition for making an initial setting.

If at step S84 the operating condition setter 80 determines that the update-setting counter XB is not greater than the number of update-setting determinations NB ("NO" branch of step S84), the process flow ends without making an update-setting of the operating condition. If at step S84 the operating condition setter 80 determines that the update-setting counter XB is greater than the number of update-setting determinations NB ("YES" branch of step S84), then at step S86 the operating condition setter 80 determines whether the operating condition set in the initial-setting process is to be updated to an operating condition for a lower build level. As an example, in a case where the operating condition set in the initial-setting process is an operating condition for the adult-build level, the operating condition setter 80 determines whether the operating condition for the adult-build level is updated to an operating condition for the child-build level. As another example, in a case where the operating condition set in the initial-setting process is an operating condition for the adult-male-build level, the operating condition setter 80 determines whether the operating condition for the adult-male-build level is to be updated to an operating condition for the adult-female-build level.

If at step S86 the operating condition setter 80 determines that the operating condition set in the initial-setting process is to be updated to an operating condition for the same or higher build level ("NO" branch of step S86), then at step S88 the operating condition setter 80 updates the operating condition set in the initial-setting process to an operating condition for the same or higher build level. Thereafter, the process flow ends. If at step S86 the operating condition setter 80 determines that the operating condition set in the initial-setting process is to be updated to an operating condition for a lower build level ("YES" branch of step S86), then the process flow ends. If at step S84 the operating condition setter 80 determines that the update-setting counter XB is not greater than the number of update-setting determinations NB ("NO" branch of step S84), then the process flow ends without updating the operating condition. That is, in the update-setting process, it is prohibited to update the operating condition set in the initial-setting process to an operating condition for a lower build level.

Figure 10:
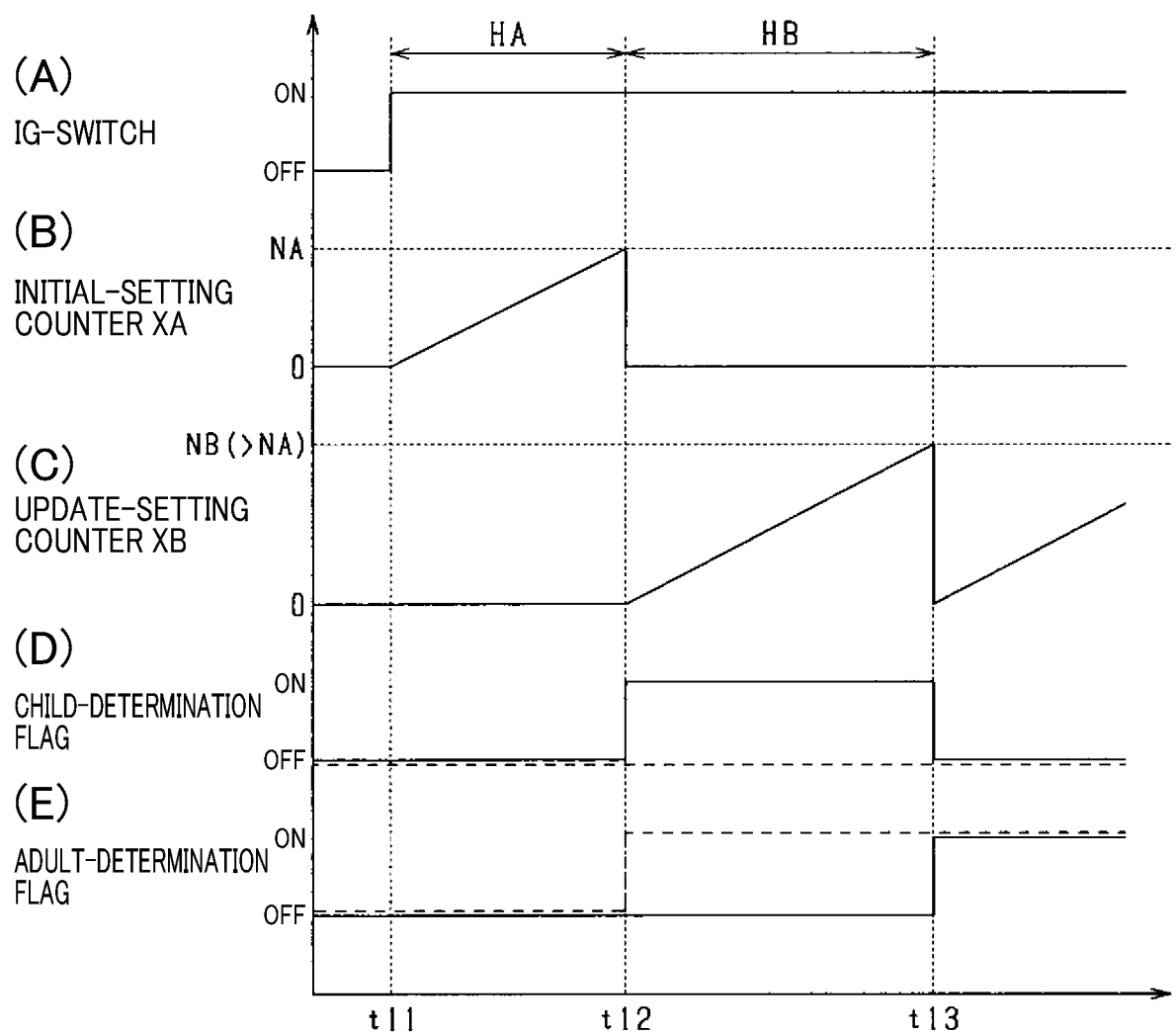
FIG. 10 is a timing diagram of the determination process according to the second embodiment.

FIG. 10 illustrates an example timing diagram for the process of making an initial setting and an update setting of an operating condition of the airbag device 51. In FIG. 10, the portion (A) illustrates a transition of the on-off state of the IG-switch 30, the portion (B) illustrates a transition of the initial-setting counter XA, and the portion (C) illustrates a transition of the update-setting counter XB.

In FIG. 10, the portion (D) illustrates a transition of a child-determination flag, and the portion (E) illustrates a transition of the adult-determination flag. The child-determination flag is set ON when the build of the occupant is determined to be at the child-build level in each of the initial-setting process and the update-setting process. The child-determination flag is set OFF when the build of the occupant is determined to be at the adult-build level in each of the initial-setting process and the update-setting process. The adult-determination flag is set ON when the build of the occupant is determined to be at the adult-build level in each of the initial-setting process and the update-setting process. The adult-determination flag is set OFF when the build of the occupant is determined to be at the child-build level in each of the initial-setting process and the update-setting process.

In the portions (D) and (E) of FIG. 10, a transition of each of the child-determination flag and the adult-determination flag is indicated by the solid line in a case where it is determined in the initial-setting process that the build of the occupant is at the child-build level, and a transition of each of the child-determination flag and the adult-determination flag is indicated by the broken line in a case where it is determined in the initial-setting process that the build of the occupant is at the adult-build level.

At time t11, the IG-switch 30 switches to the on-state, triggering start-up of the vehicle. Thereafter, the occupant-build determination process is performed every predetermined time interval, and incrementing the initial-setting counter XA begins. At time t12 when the initial-setting counter XA exceeds the number of initial-setting determinations NA, an initial setting of the operating condition is made based on effective results of determination acquired during the initial-setting period HA from time t11 to time t12.

At time t12, the initial-setting counter XA is initialized and incrementing the update-setting counter XB begins. At time t13 when the update-setting counter XB exceeds the number of update-setting determinations NB, an update-setting of the operating condition is made based on effective results of determination acquired during the update-setting period HB from time t12 to time t13. Since the number of update-setting determinations NB is set greater than the number of initial-setting determinations NA, the update-setting period HB is greater than the initial-setting period HA. Thereafter, the update setting of the operating condition is repeatedly made each time the update setting period HB elapses.

As indicated by the solid lines in the portions (D) and (E) of FIG. 10, when it is determined that the build of the occupant is at the child-build level in the initial-setting process, the operating condition set in the initial-setting process is allowed to be updated to the operating condition for the adult-build level in the update-setting process. That is, updating the operating condition set in the initial-setting process to the operating condition for a higher build level is allowed.

As indicated by the broken lines in the portions (D) and (E) of FIG. 10, when it is determined that the build of the occupant is at the adult-build level in the initial-setting process, updating the operating condition set in the initial-setting process to the operating condition for the child-build level is prohibited in the update-setting process. That is, updating the operating condition set in the initial-setting process to an operating condition for a lower build level is prohibited. Even after the update setting has been made, the operating condition set based on the adult-build level is maintained.

The second embodiment set forth above can provide the following advantages.

(B1) Since it is desired to early complete initial setting of an operating condition of the airbag device 51, the initial-setting period HA is limited. However, a sufficient number of effective results of determination may not be acquired during such a limited initial-setting period HA, which may reduce the determination accuracy. With the reduced determination accuracy, the build of the occupant may be determined to be at a lower build level than the actual build level while the build of the occupant may not be determined to be at a higher build level than the actual build level. In the event where, in the update-setting process, the operating condition set in the initial-setting process is updated to an operating condition for a lower build level, a false determination of the build of the occupant is likely to occur.

In the present embodiment, updating the operating condition set in the initial-setting process to an operating condition for a lower build level is prohibited. This can inhibit making an update-setting of the operating condition of the airbag device 51 based on a false determination of the build of the occupant.

OTHER EMBODIMENTS

Embodiments for implementing the present disclosure have been described above, but the present disclosure is not limited to the above-described embodiments and can be implemented with various modifications.

(C1) A determination as to whether the vehicle 10 is in operation may be made based on the vehicle speed, instead of the on-off state of the IG-switch 30.

(C2) The imager 21 may be any kind of imager able to acquire luminance information of images GA, such as a monocular camera, a stereo camera, a time-of-flight camera (ToF camera), or the like. However, the imager 21 able to acquire 3D positions, such as a ToF camera, is so expensive to give rise to an issue of large product cost. In the present embodiment, the on-board system 100 is configured by using only an inexpensive imager 21 adapted to acquire 2D positions, which can suppress an increase in product cost.

(C3) The imager 21 is not limited to an on-board imager. For example, a personal digital assistance (PDA) may be used as the imager 21, where the occupant-build determination apparatus 40 acquires images GA from the PDA via wireless communications or the like.

(C4) A result of determination of the build of the occupant made based on the shoulder-joint information MS may be corrected based on a state of the seat 14 in which the occupant is sitting. The state of the seat 14 may be specified by a slide position and a reclining angle of the seat 14.

A further forward slide position of the seat 14 corresponds to a larger build of the occupant in the image GA. In such a case, the slide position of the seat 14 is determined based on a position of the right waist joint and a position of the left waist joint of the occupant in the image GA. The shoulder-width WA and the sitting height of the occupant may be corrected based on the determined slide position.

A larger reclining angle of the seat 14 corresponds to a smaller build of the occupant in the image GA. In such a case, the reclining angle of the seat 14 may be determined based on a slope of a linear line connecting a middle position of the right shoulder joint RP and a position of the left shoulder joint LP of the occupant and a middle position of a position of the right waist joint and a position of the left waist joint of the occupant in the image GA. The shoulder-width WA and the sitting height of the occupant may be corrected based on the determined reclining angle of the seat 14.

(C5) Types of occupant builds are not limited to the types described above. The number of build levels to be determined is not limited to three (i.e., 6YO, AF05, and AM50), but may also be two or four or more.

(C6) Canceling a determination of the build of the occupant is not limited to prohibiting to make a determination of the build of the occupant or not making a determination of the build of the occupant based on the shoulder-joint information MS that was used to determine that the occupant is in a twisted posture, but may include not using a result of determination of the build of the occupant based on the shoulder-joint information MS. For example, in the occupant-build determination process, given position information MA calculated, a determination as to whether the build of the occupant is at the adult-build level or at the child-build level may be made prior to determining whether the occupant is in a twisted posture. Whether a result of determination of the build of the occupant is used may be determined after determining whether the occupant is in a twisted posture.

(C7) The occupant restraining device is not limited to the airbag device 51, but may be a seat belt device adapted to control extension and retraction of the seat belt 15. The operating condition of the seat belt device is defined by the start-up timing, the winding intensity and the like. Given a higher build level determined, the start-up timing is set earlier and the winding intensity is set higher.

Figure 11:
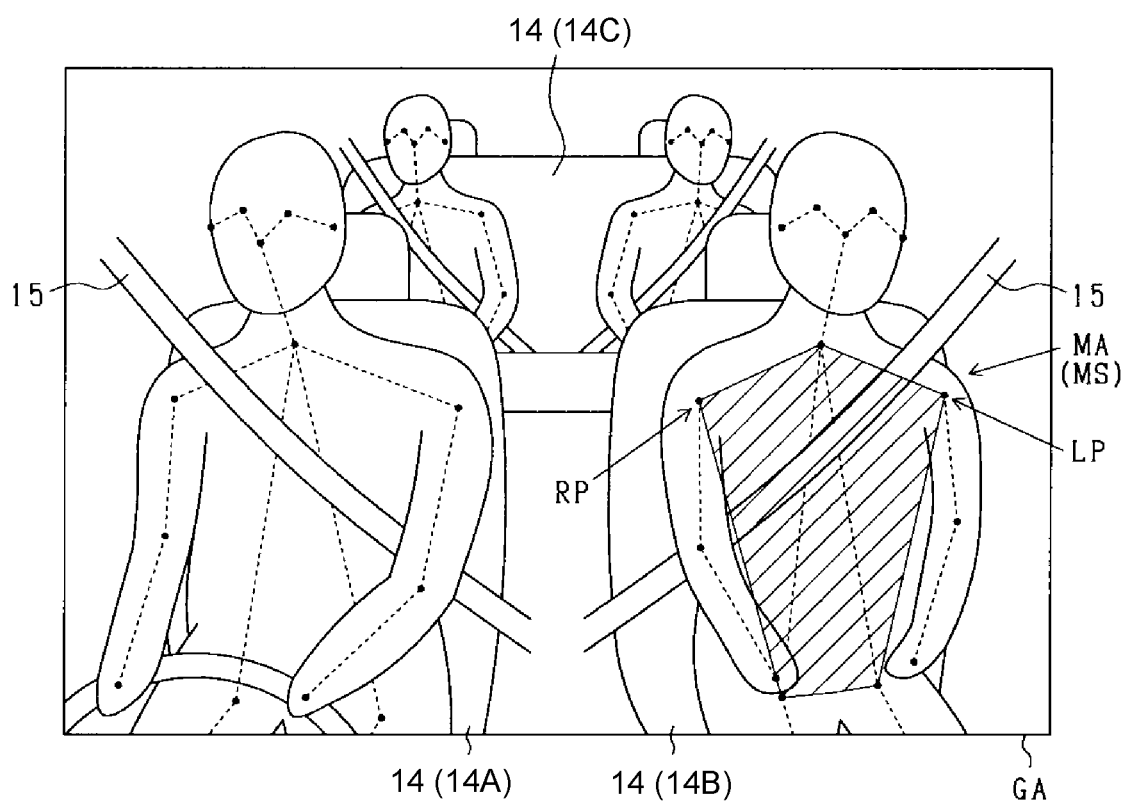
FIG. 11 is an illustration of an occupant-area of an occupant according to a modification.

(C8) An area of an upper body of the occupant may be calculated as the occupant-area MB of the occupant. Given position information MA calculated, the occupant-area MB may be calculated based on the position information MA. Referring to FIG. 11 illustrating an occupant sitting in the front passenger seat 14B, the area of an area defined by connecting a position of the right shoulder joint RP, a position of the neck joint, a position of the left shoulder joint LP, a position of the left waist joint, and a position of the left waist joint of the occupant in the image GA in this order may be calculated. This can reduce a processing burden of the occupant-build determination apparatus 40 in the occupant-build determination process.

(C9) A result of detection by the sitting-surface sensor 23, instead of or as well as the occupant-area MB of the occupant, may be used. This allows for weight-based determination of the build of the occupant.

(C10) The normal-build data DB is not limited to the build data of crash test anthropomorphic dummies for the vehicle 10. In an alternative embodiment, build data may be acquired from a plurality of occupants and stored as learned values. An average of these learned values may be used as the normal-build data DB.

What is claimed is:

1. An apparatus for determining a build of an occupant sitting in a seat within a cabin of a vehicle, comprising:
   a non-transitory memory storing one or more computer programs;
   a processor executing the one or more computer programs to:
   acquire an image of the occupant;
   calculate shoulder-joint information that is information representing positions of a left shoulder joint and a right shoulder joint of the occupant in the image;
   calculate an area occupied by the occupant in the image;
   determine whether the occupant comprises an adult-build level or a child-build level based on the shoulder-joint information;
   determine the build of the occupant based on the area that is calculated; and
   determine whether the occupant is in a twisted posture based on the shoulder-joint information; and
   determine a build of the occupant based on the shoulder-joint information,
   wherein the processor further executes one or more computer programs to:
   in response to determining that the occupant is in the twisted posture, determine whether the occupant comprises the adult-build level;
   for a state in which the occupant is determined to comprise the adult-build level, calculate the area occupied by the occupant in the image; and
   in response to calculating the area occupied by the occupant in the image, determine the build of the occupants is at an adult-male-build level or at an adult-female-build level based on the area that is calculated.

2. The apparatus according to claim 1, wherein
   the processor executes the one or more computer programs to determine whether the occupant is in the twisted posture based on a shoulder angle with respect to a horizontal direction, the shoulder angle comprising an angle of a linear line connecting a position of the right shoulder joint and a position of the left shoulder joint.

3. The apparatus according to claim 2, wherein
   the processor executes the one or more computer program to, in response to a shoulder-width, which is a length of a linear line segment between the position of the right shoulder joint and the position of the left shoulder joint, being equal to or greater than a predetermined shoulder-width threshold, determine that the build of the occupant comprises the adult-build level, regardless of a result of the determination.

4. The apparatus according to claim 1, wherein
   the vehicle is equipped with an occupant restraining device configured to restrain the occupant from being thrown out from the seat, and
   the processor executes the one or more computer programs to, based on a result of the determination of the build of the occupant, make an initial setting and an update setting of an operating condition of the occupant restraining device, and prohibit updating the operating condition to an operating condition for a different build level.

5. The apparatus according to claim 4, wherein the occupant restraining device is a seat belt device.

6. The apparatus according to claim 1, wherein
   the processor executes the one or more computer programs to determine that the build of the occupant is at the adult-build level, determine whether the build of the occupant is one of the plurality of predefined builds based on the predefined-build data stored in a storage,
   wherein the processor executes the one or more computer programs to calculate the area occupied by the occupant in the image, provided that it is determined that the build of the occupant is none of the plurality of predefined builds.

7. The apparatus according to claim 1, wherein the processor executes the one or more computer programs to, based on the calculated area, determine whether the build of the occupant determined to be at the adult-build level is at an adult-male-build level or at an adult-female-build level.

8. An apparatus for determining a build of an occupant sitting in a seat within a cabin of a vehicle, comprising:
   a non-transitory memory storing one or more computer programs; and
   a processor executing the one or more computer programs to:
   acquire an image of the occupant; and
   determine whether the occupant comprises an adult-male-build level, an adult-female-build level or a child-build level, wherein determining whether the occupant comprises the adult-male-build level, the adult-female-build level or the child-build level comprises:
   determining whether the occupant is in a twisted posture by comparing a shoulder angle to an angle threshold, the shoulder angle comprising an angle of a line connecting a left shoulder joint and a right shoulder joint of the occupant in the image relative to a horizontal direction that is parallel to a width direction of the vehicle;
   for a state in which the occupant is determined not to be in the twisted posture, determining whether the occupant is an adult-build level or a child-build level by comparing a shoulder-width of the occupant to a first shoulder-width threshold, the shoulder-width comprising a length between the left shoulder joint and the right shoulder joint of the occupant;

for a state in which the occupant is determined to be in the twisted posture, determining whether the occupant is a normal build by comparing a ratio of the shoulder-width and a sitting height of the occupant to a predefined ratio range, the sitting height comprising a length between a middle position between the left shoulder joint and the right shoulder joint of the occupant and a middle position between a right waist joint and a left waist joint;

for a state in which the occupant is determined to be the normal build, determining whether the occupant is the adult-male-build level or the adult-female-build level by comparing the shoulder-width of the occupant to a second shoulder-width threshold; and for a state in which the occupant is determined not to be the normal build, determining whether the occupant is the adult-male-build level or the adult-female-build level by comparing an area occupied by the occupant in the image to an occupant-area threshold.

9. The apparatus according to claim 8, wherein for a state in which the occupant is determined to not be in the twisted posture and determined not to be the adult-build level, the occupant is determined to be the child-build level, for a state in which the occupant is determined to be in the twisted posture, determined to be the adult-build level, determined to be the normal build and the area occupied by the occupant is determined to be less than the occupant-area threshold, the occupant is determined to be the adult-female-build level, for a state in which the occupant is determined to be in the twisted posture, determined to be the adult-build level, determined not to be the normal build and the area occupied by the occupant is equal to greater than the occupant-area threshold, the occupant is determined to be the adult-male-build level, and for a state in which the occupant is determined to be in the twisted posture, determined to be the adult-build level, determined not to be the normal build and the shoulder-width is less than the second shoulder-width threshold, the occupant is determined to be the adult-female-build level.

* * * * *